United States Patent Office 3,522,054
Patented July 28, 1970

3,522,054
FAT CONTAINING MILK POWDER
Patrick G. P. Cavroy, 29 Avenue Rapp, Paris VII, France; Michel E. M. Rambaud, 7 Rue de la Terrasse, 75 Paris 17°, France; Charles M. J. E. Cousin, 87 Boulevard Victor Hugo, 62 Bethune, Pas-de-Calais, France; and Gerard G. E. Savignac, 53 Rue Lauriston, 75 Paris XVI, France
No Drawing. Filed Mar. 7, 1967, Ser. No. 621,159
Claims priority, application France, Mar. 7, 1966, 52,296
Int. Cl. A23c 9/00, 11/00
U.S. Cl. 99—56            6 Claims

ABSTRACT OF THE DISCLOSURE

Fat containing milk powder is prepared by a process having the steps of forming a mixture containing a skim milk concentrate, a fatty substance of non-dairy origin and a gum or amyloid thickener, homogenizing the mixture, spray drying the homogenized mixture and grinding the spray dried product to substantially reduce the particle size. The product is characterized by having improved distribution of fat within the particles of powder, by being easily soluble and by being capable of undergoing a very strong grinding action without the oozing of fat to any considerable extent.

---

The present invention is directed to an improvement in quality of fatty milk products in powder form, including non-skimmed whole milk as well as fattened milk consisting of skim milk fortified with a suitable faty substance, such as used as milk substitute for feeding young mammals, particularly meat calves.

A conventional method of production of powdered milk, known as spray method, consists in drying concentrated and homogenized milk by spraying. The resulting whole milk powder is usually very soluble but its solution is not rapid, particularly in the absence of heat.

It is generally thought that the low rate of solution is due to the presence of a small amount of fatty substance on the surface of the particles of powder.

It is known in fact that, in particles of powdered milk, the major part of the fatty substance is to be found in the core, and is therefore surrounded by a layer of lactose and proteins.

In view of that distribution of fatty substance, powdered milk containing 24–26 percent of fat feels to the touch like a dry product. The partial extraction of fat obtainable by washing the powder in a mixture of sulphuric ether and hexane confirms that distribution in that only the small quantity of non-covered fatty substance (amounting to 5 to 10 percent of the fat content in an ordinary spray milk) becomes washed away. A more thorough extraction, particularly by means of the Soxhlet apparatus, and using the same solvent, increases the extraction rate to 90–95 percent of the total fat content, and the rate increases further when using a mixture of ethylic alcohol and benzene as solvent, the quantity of fat then extracted becoming very nearly equal to the total fat content. This distribution of fat explains the low rate of solution.

Moreover, there occurs in the course of grinding of fatty milk powders, produced by pulverizing whole milk or fattened milk, a noticeable oozing of fatty substance, which makes grinding difficult. The grinding operation becomes even impossible in the case of ultrasonic grinding, such as is carried out in apparatus of the Ultrafine type (registered trademark) for obtaining a high degree of fineness.

One object of the present invention is to remedy the above-mentioned disadvantages and to produce powdered milk, either whole or fattened, wherein the fatty substance is better distributed and more difficult to extract, so that the milk is more easily soluble and more capable of undergoing a very strong grinding action without oozing to any considerable extent.

A method according to the invention consists in adding a thickener to the fat milk product consisting of whole milk or fattened milk, said thickener being added after concentration but before homogenization and drying of said product. The thickener, which increases the viscosity, is a gum or an amyloid substance such as starch.

The gums used are alginates, carragheenates, pectins, guar gums or any other thickening substances, used singly or as mixtures. They are preferably added to the previously concentrated milk as suspensions or thick solutions.

The gum is added in a weight ratio of 2 to 6 parts per thousand, and preferably 4 parts per thousand, relatively to the dry extract of the final product freed of its fat content.

The gum may be replaced by starch paste or a suspension of pre-gelatinized starch, using the required quantity of starch for obtaining the same viscosity (approximately 10 times as much starch as gum).

The mixture gum-milk is homogenized, and the added gum, by increasing the viscosity and practically doubling it, allows the use of much higher pressures, thus affording improved homogenization.

The homogenized product is then dried by pulverizing according to a conventional method.

The preconcentrated milk may contain lecithin and/or glycerol monostearate, as an additive. Lecithin is added in the proportion of 0.3 to 2 percent, preferably 0.5 to 1 percent, and glycerol monostearate is added in the proportion of 0.5 to 4 percent, preferably 1 to 2 percent, relatively to the fat content.

Lactoserum may be used in fattened milk to replace part or the whole of the skim milk.

The applicants have made a particular study of the quantity of fat which it is possible to extract by different means, before and after Ultrafine grinding, from a series of fattened products having various total amounts of fat and obtained as follows:

Concentrated skim milk, having 38 gr. of dry substance per 100 gr., was mixed with guar gum added in the proportion of 1.5 kg. per 1000 kg. of concentrated milk. The gum was added as a 1 percent aqueous solution. The added fat was refined palm oil to which were added 0.7 percent of lecithin and 2 percent of glycerol monostearate. The quantity added in the various tests was such as to give a fat content of 12, 26, and 40 percent, measured in the dry product.

The fattened milk was homogenized under a pressure of 180 kg./sq. cm. and dried in a spray tower.

Tests carried out on these various fattened milk powders gave the following results.

|  | Fat extraction rate as percentage of fat content |
|---|---|
| Milk fattened to 12 percent: |  |
|    Ether-hexane washing | 1.6 |
|    Soxhlet ether-hexane | 48 |
|    Soxhlet alcohol-benzene | 53 |
| Milk fattened to 12 percent, tested after Ultrafine grinding: |  |
|    Ether-hexane washing | 5 |
|    Soxhlet ether-hexane | 49 |
|    Soxhlet alcohol-benzene | 53 |
| Milk fattened to 26 percent: |  |
|    Ether-hexane washing | 1.8 |
|    Soxhlet ether-hexane | 39 |
|    Soxhlet alcohol-benzene | 45 |

Milk fattened to 26 percent, tested after Ultrafine grinding:
    Ether-hexane washing _____ 8
    Soxhlet ether-hexane _____ 40
    Soxhlet alcohol-benzene _____ 48

A reference normal milk having 26 percent of fat gave extraction rates amounting to 7, 94 and 99 percent respectively.

|  | Fat extraction rate as percentage of fat content |
|---|---|
| Milk fattened to 40 percent: |  |
| Ether-hexane washing | 2.2 |
| Soxhlet ether-hexane | 43 |
| Soxhlet alcohol-benzene | 58 |
| Milk fattened to 40 percent, tested after Ultrafine grinding: |  |
| Ether-hexane washing | 17 |
| Soxhlet ether-hexane | 55 |
| Soxhlet alcohol-benzene | 75 |

The applicants have also analysed the degree of fineness of the various products.

An ordinary whole milk powder having 26 percent of fat left 80 percent on a 50μ mesh (Afnor 18) and 50 percent on a 80μ mesh (Afnor 20).

The percentages left on various meshes by milk powders produced according to the invention were as follows:

|  | 50μ mesh Afnor 18 | 80μ mesh Afnor 20 | 125μ mesh Afnor 22 |
|---|---|---|---|
| Milk fattened to 12 percent | 70 | 30 | 2 |
| The same after Ultrafine grinding | 30 | 8 | 0 |
| Milk fattened to 26 percent | 72 | 34 | 3 |
| The same after Ultrafine grinding | 36 | 10 | 0 |
| Milk fattened to 40 percent | 75 | 44 | 8 |
| The same after Ultrafine grinding | 55 | 15 | 1 |

The solution rate improved with decreasing fat contents. Milk powder prepared according to the invention and containing 26 percent of fat showed a solution rate 50 percent higher than ordinary milk having the same fat content.

EXAMPLE 1

To 2000 kg. of skim milk concentrated to 39 percent dry extract by weight and heated to 55° C., were added and stirred 300 kg. of a 1 percent suspension of guar gum in water and 280 kg. of melted refined palm oil, to which 1.5 kg. of lecithin and 3 kg. of glycerol monostearate had previously been added.

The mixture was homogenized under a pressure of 180 kg./sq. cm. and sent to a pulverizing tower, where it yielded a fattened milk powder having a fat content of 26 percent and a moisture content of 3 percent.

The powder so obtained was able to undergo an Ultrafine grinding operation without causing any considerable oozing of fat. The final product, containing 26 percent of fat, proved to be suitable for making confectionary, instantly soluble breakfast foods, cattle feeding-stuff, etc.

EXAMPLE 2

To 2000 kg. of skim milk concentrated to 35 percent dry extract by weight and brought to a temperature of 55° C., were added and stirred 4 kg. of carragheenate as a 1 percent suspension, and 510 kg. of melted refined palm oil to which were previously added 3 kg. of lecithin and 5 kg. of glycerol monostearate.

The mixture was homogenized under a pressure of 210 kg./sq. cm. and sent to the pulverizing tower, to yield a fattened milk powder containing 42 percent of fat and 2.2 percent of moisture.

EXAMPLE 3

In a vessel having a working capacity of 3000 litres 500 kg. of skim milk concentrated to 20 percent by weight of dry extract were heated to 90° C. and 20 kg. of indian corn starch were added thereto. The temperature was maintained for 10 minutes and the mixture was then cooled by adding 1500 kg. of skim milk concentrated to 42 percent by weight of dry extract. The temperature was then adjusted to 60° C. 300 kg. of first grade refined tallow in which were previously mixed 2 kg. of lecithin, were then added to the contents of the vessel. The resulting mixture was homogenized under a pressure of 200 kg./sq. cm. and sent to the pulverizing tower.

The tower yielded a fattened milk powder containing 28.5 percent of fat, suitable for feeding calves.

Besides the above-described method of production of fat milk powders, the invention covers all easily soluble fattened milk powders and whole milk powders capable of undergoing a grinding operation without oozing, obtained thereby.

Wat we claim is:

1. A process for preparing a powder including at least one nonfat milk product and at least one fatty substance, which comprises the steps of:
    preparing a skim milk conceentrate;
    adding fatty substances of non-dairy origin to said concentrate in an amount such that there tends to be oozing of fatty substances upon subsequent grinding;
    adding as a thickener a gum selected from the group consisting of alginates, carragheenates, pectins and guar gum, in a small amount effective to inhibit oozing of fatty substances upon subsequent grinding;
    subjecting the resulting mixture to homogenization under pressure and spray drying; and
    grinding the thus-obtained fatty milk powder to substantially reduce the particle size of said milk powder.

2. A process as claimed in claim 1, said small amount being about 2 to 6 parts per thousand relative to the dry extract of the final product freed of its fat content.

3. A process as claimed in claim 1, said small amount being about 4 parts per thousand relative to the dry extract of the final product freed of its fat content.

4. A process for preparing a powder including at least one nonfat milk product and at least one fatty substance, which comprises the steps of:
    preparing a skim milk concentrate;
    adding fatty substances of non-dairy origin to said concentrate in an amount such that there tends to be oozing of fatty substances upon subsequent grinding;
    adding as a thickener an amyloid substance in a small amount effective to inhibit oozing of fatty substances upon subsequent grinding;
    subjecting the resulting mixture to homogenization under pressure and spray drying; and
    grinding the thus-obtained fatty milk powder to substantially reduce the particle size of said milk powder.

5. A process as claimed in claim 4, said small amount being about 20 to 60 parts per thousand relative to the dry extract of the final product freed of its fat content.

6. A process as claimed in claim 4, said small amount being about 40 parts per thousand relative to the dry extract of the final product freed of its fat content.

References Cited

UNITED STATES PATENTS 1,432,635   10/1922   Stevens _____ 99—203 X (Other references on following page)

UNITED STATES PATENTS

| | | | |
|---|---|---|---|
| 2,719,792 | 10/1955 | Rollins et al. | 99—203 X |
| 2,934,441 | 4/1960 | Morgan et al. | 99—201 |
| 3,001,876 | 9/1961 | Loewenstein | 99—200 X |
| 3,065,076 | 11/1962 | Wenner et al. | 99—201 X |

OTHER REFERENCES

Hibbs et al.: The Solubility of Whole Milk Powder As Affected by Protein Stabilizers and by Emulsifiers, J. Dairy Science, vol. 34, 1951 (pp. 1084–1091).

LIONEL M. SHAPIRO, Primary Examiner

D. M. NAFF, Assistant Examiner

U.S. Cl. X.R.

99—55, 63, 203